United States Patent [19]

Mills

[11] 3,833,774
[45] Sept. 3, 1974

[54] CABLE SUPPORT FOR OVERHEAD CRANE TROLLEYS

[75] Inventor: Robert George Mills, Galt, Ontario, Canada

[73] Assignee: Dresser Industries, Inc., Dallas, Tex.

[22] Filed: Sept. 19, 1972

[21] Appl. No.: 290,282

[52] U.S. Cl............................ 191/12 R, 137/355.16
[51] Int. Cl............................................. H02g 11/00
[58] Field of Search ........ 191/12 R; 248/49, 51, 52; 137/355.16

[56] References Cited
UNITED STATES PATENTS

| | | | |
|---|---|---|---|
| 2,358,116 | 9/1944 | Wehr | 191/12 R |
| 3,042,760 | 7/1962 | Thumim | 191/12 R |
| 3,410,415 | 11/1968 | Becker | 191/12 R |
| 3,433,889 | 3/1969 | De Vries | 191/12 R |
| 3,590,854 | 7/1971 | Cork | 137/355.16 |

Primary Examiner—M. Henson Wood, Jr.
Assistant Examiner—D. W. Keen
Attorney, Agent, or Firm—Daniel Rubin

[57] ABSTRACT

Cable support apparatus for an extensive length of power supply cable connecting an electrical power source to an overhead crane trolley. An elongated, open V-trough is defined extending longitudinally juxtaposed to a cross girder of the trolley bridge. Electrical power cable extending from a power source at the bridge end truck to the trolley, is received and contained in the trough from which it is dragged by the trolley over its traversing course on the bridge.

7 Claims, 5 Drawing Figures

PATENTED SEP 3 1974 3,833,774
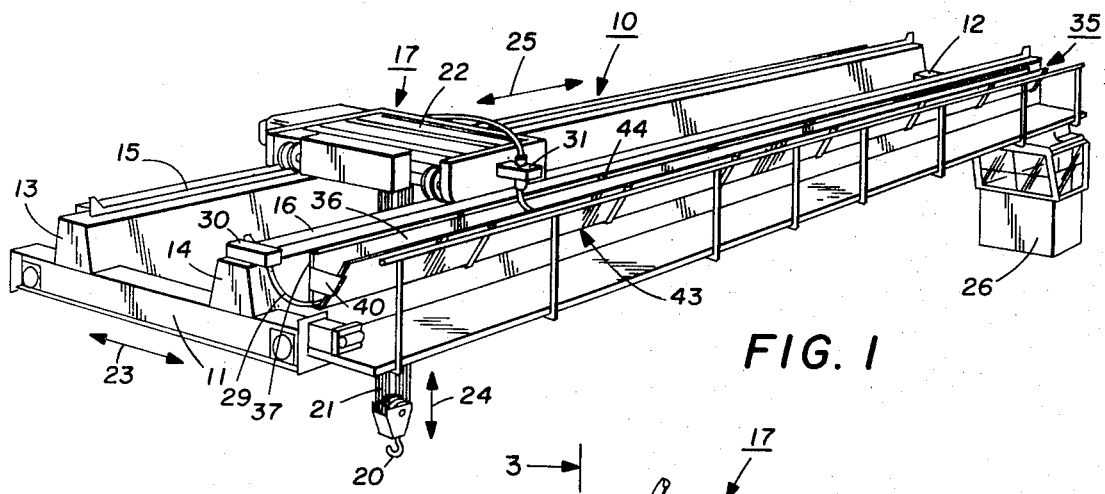
FIG. 1
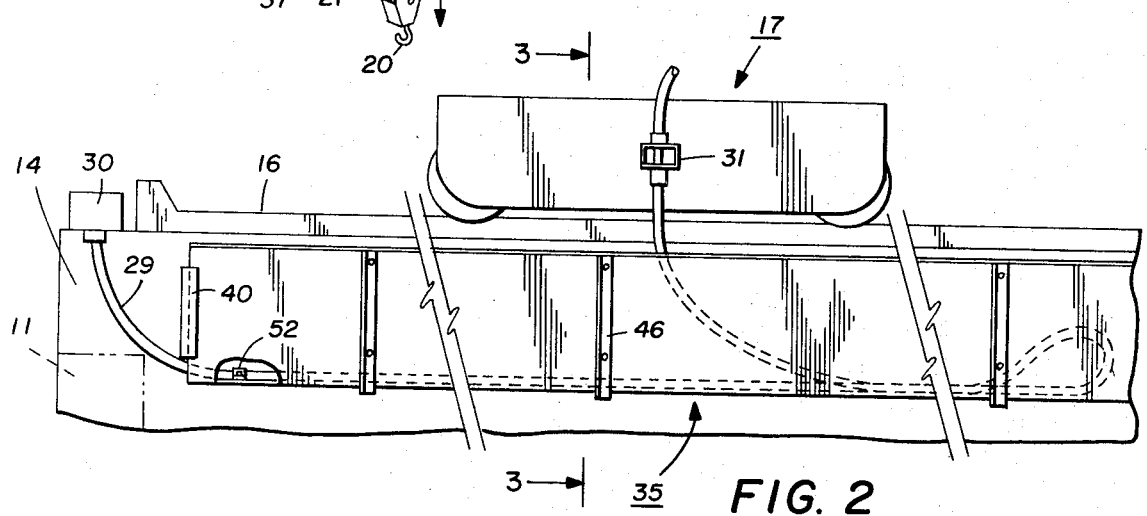
FIG. 2
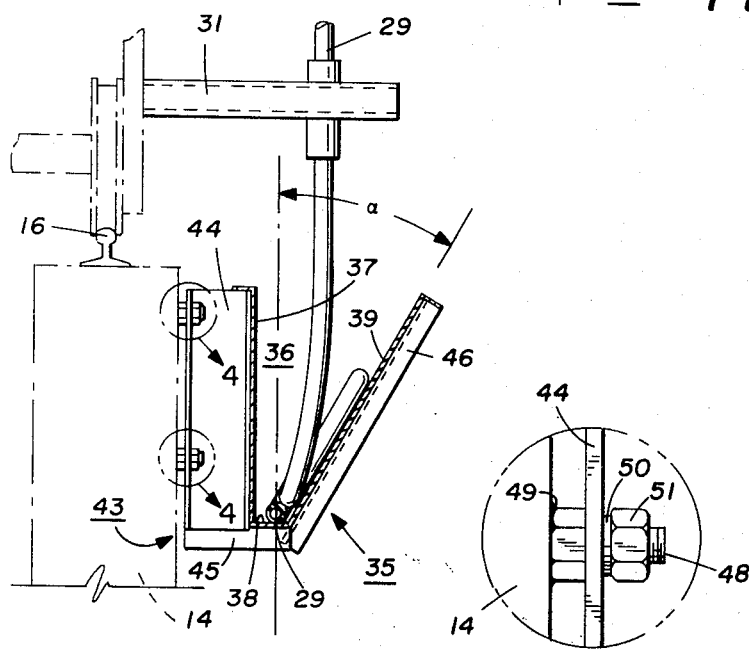
FIG. 3
FIG. 4
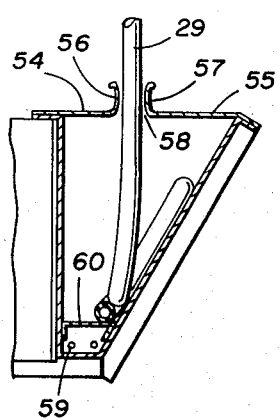
FIG. 5

CABLE SUPPORT FOR OVERHEAD CRANE TROLLEYS

BACKGROUND OF THE INVENTION

The field of art to which the invention pertains includes the art of "Electricity, Transmission To Vehicles" as specifically applied to traveling overhead trolleys.

Motor driven hoists and cranes are commonly employed in a wide variety of industrial applications for lifting and transporting articles from one location to another. Whether for a hoist or crane, the motor driven hoisting trolley per se is usually supported on a bridge of sorts over which the trolley traverses in its course of operation. Electrical power to the trolley is furnished via a long flexible cable connected thereto from a source of electrical power. Cable length must, of course, be at least adequate to accommodate maximum separation between trolley and power source when the former is at its relatively extreme location on the bridge. Such maximum separation generally corresponds to the bridge span which frequently reach 90 feet or more. When relatively closely spaced, the unneeded length of a flexible cable naturally develops slack that increases significantly as the moving trolley drags the cable toward the site of the power source.

To avoid tangling or extensive drooping of slack power cables in these uses, various cable or conductor supporting devices have been devised. One such device is a festooning cable support as, for example, disclosed in U.S. Pat. No. 2,571,832. Another is a support for bare wire conductors as, for example, disclosed in U.S. Pat. No. 3,031,540. Yet another device is a commercially available cable reel providing a spring tensioned wind-up that maintains the cable slack-free at all trolley locations.

While each of the foregoing arrangements have generally performed satisfactorily, they have been recognized as representing a disproportionate manufacturing expense, particularly where the bridge spans are unduly long. Despite recognition of this problem, an economic solution thereto has not heretofore been known.

SUMMARY OF THE INVENTION

The invention relates to apparatus for supporting electrical power cable from a power source to an overhead crane trolley. More particularly, the invention relates to improved trolley cable supporting structure able to contain slack cable without incurring tangling, drooping or the like and yet is appreciably simpler in construction and consequently less costly to fabricate than similar purpose devices of the prior art. In accordance herewith, this is achieved by a cable support defined as an open V-trough secured longitudinally juxtaposed to the cross girder of the trolley bridge. The cable is received and contained loosely in the trough from which it is dragged to and fro by movement of the trolley. Since the trough is comprised completely of readily available structural components, maximum of simplicity is afforded such that both its fabrication and maintenance costs are appreciably less than has been previously known for similar purpose devices.

It is therefore an object of the invention to provide novel support structure for receiving and containing electrical cable supplying power from a source to an overhead traveling trolley.

It is a further object of the invention to provide a novel cable support structure for supporting and containing electrical cable as in the aforesaid object that is appreciably less expensive to fabricate and maintain than comparable similar purpose devices of the prior art.

BRIEF DESCRIPTION OF THE DRAWINGS

FIG. 1 is an isometric view of an overhead traveling crane employing the cable support in accordance herewith;

FIG. 2 is a front elevation of the cable support;

FIG. 3 is a sectional view taken substantially along the lines 3—3 of FIG. 2;

FIG. 4 is a fragmentary enlargement of the encircled portions of FIG. 3; and

FIG. 5 is a modified sectional view taken substantially along the lines 3—3 of FIG. 2.

Referring now to the drawings and initially to FIG. 1, there is illustrated an overhead crane exemplifying apparatus with which the invention hereof is to be employed. Briefly, the crane is comprised of a bridge 10 consisting of opposite end trucks 11 and 12 adapted for movable mounting on elevated runway beams (not shown) provided at the site of installation. Laterally connecting the end trucks are parallel, spaced-apart longitudinal girders 13 and 14 having on their top surfaces tracks 15 and 16 respectively defining a traversal course for trolley 17. A load hook 20 is supported from the trolley via ropes 21 reeved about drum 22, for raising and lowering of loads, as required. The various movable components are variously operably in the directions indicated by arrows 23, 24 and 25 under control of an operator situated in underhung operator cab 26. Operating power is provided via long flexible electrical cable 29 extending from a live junction box 30 at the truck end through a connector arm 31 to the motor power connection of trolley 17.

Referring additionally now to FIGS. 2-4, there is shown the cable support in accordance herewith and designated 35. Defining the support is an elongated horizontally extending open V-shaped trough 36 of substantially ¼ or ⅜ inch welded stock. Forming the trough is a vertical side wall 37 connecting with a horizontal bottom wall 38, in turn, connecting to an obliquely canted side wall 39 welded at intermediate locations via a welding plate 40. Angle α of side wall 39 is about 25° to 45° from the vertical, preferably at least 30°. For securing the support juxtaposed to the face of girder 14, there is provided a plurality of longitudinally displaced V-brackets 43 each of which includes a vertical channel section 44 and a canted angle section 46 joined together at their underside by a horizontal base section 45. Each bracket, in turn, is secured as a unit by means of a bolt 48, the head of which is welded at 49 to the web plate of girder 14 while its shank extends through the side wall of channel 44 to receive washer 50 and nut 51. Several displaced clamps 52 secure a basic length of cable 29 to the trough bottom.

A variation of cable support 35 adapted for outdoor service is illustrated in FIG. 5. This embodiment is more suitable where the problems of snow or ice entering the trough could otherwise encumber freedom of cable movement. For these reasons, the trough is of increased vertical depth and substantially closed on its top side via cover sections 54 and 55. Each cover section includes a longitudinally extending flexible lip 56 or 57 of rubber or the like to define a longitudinal cable channel 58 therebetween. A commercial eaves-trough heater 59 is situated along the channel bottom and is enclosed on its topside by a perforated cover 60 whereby heat can be emitted to the trough when required.

In either embodiment, cable 29 extends from junction box 30 into the trough on which it is supported generally along bottom wall 38 (or heater plate 60) and side wall 39 as trolley 17 traverses over rails 15 and 16 in the course of its operations. The cable is continuously dragged by the trolley along the trough such that wherever the trolley happens to be, incurred cable slack generally lodges toward the trough bottom. Whereas some curling of slack may occur, it has been found that by this arrangement, tangling is unexpectedly avoided thereby providing cable length as required without encumbering trolley operation.

By the above description, there is disclosed a novel cable support for an overhead crane trolley whereby the expense and complications of previous devices are appreciably eliminated. Since the trough is completely comprised of basic structural components readily available from commercial sources without any moving parts, both its fabrication and maintenance costs are substantially less than other structures previously available for this purpose. By virtue of this construction, any bridge span can be readily accommodated by merely custom adding or substracting longitudinal sections of trough as required on site of fabrication without the necessity of special assembly capacities or equipment in the manner previously resorted to.

Since many changes in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In an overhead hoisting apparatus including means defining an elongated horizontal bridge, an electric hoist trolley adapted to traverse said bridge in the course of hoisting operations, and an elongated length of flexible power cable adapted to connect said trolley with a power source for obtaining operative power therefor over the span of said bridge, a cable support means comprising an open elongated member extending generally parallel and juxtaposed to said bridge, said member comprising a generally V-shaped trough having a closed bottom wall against which to generally receive and contain said cable in a vertical slack-loose overlapping relation over the traverse of said bridge by said hoist trolley and including at least one wall extending inclined at an oblique angle relative to an intersecting vertical plane.

2. In an overhead hoisting apparatus according to claim 1 in which said member is of a longitudinal length terminating substantially coterminous with said bridge.

3. In an overhead hoisting apparatus according to claim 1 including bracket members secured to said bridge and supporting said trough.

4. In an overhead hoisting apparatus according to claim 1 in which said at least one wall comprises the trough wall laterally most displaced from said bridge and said angle is in the range of about 25°–45°.

5. In an overhead hoisting apparatus according to claim 4 in which said angle is at least 30°.

6. In an overhead hoisting apparatus according to claim 5 in which said trough includes cover means on the topside for generally sealing against environmental precipitation, said cover means defining a longitudinal channel through which said cable can extend into and out of said trough.

7. In an overhead hoisting apparatus according to claim 6 including electrically energized heater means mounted in said trough.

* * * * *